Figure 1:
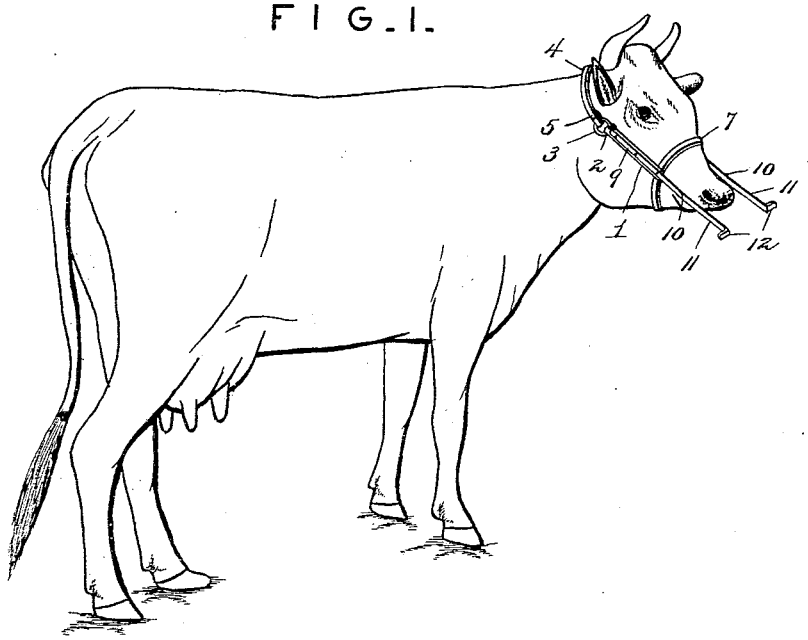

No. 664,800. Patented Dec. 25, 1900.
T. B. WHITE.
MUZZLE.
(Application filed June 14, 1900.)
(No Model.)

Witnesses
Harry L. Amer.
L. E. Tibbetts.

Inventor
Thomas Benton White
By Rexford M. Smith, Attorney

THE NORRIS PETERS CO., PHOTO-LITHO., WASHINGTON, D. C.

UNITED STATES PATENT OFFICE.

THOMAS BENTON WHITE, OF WARSAW, MISSOURI.

MUZZLE.

SPECIFICATION forming part of Letters Patent No. 664,800, dated December 25, 1900.

Application filed June 14, 1900. Serial No. 20,320. (No model.)

*To all whom it may concern:*

Be it known that I, THOMAS BENTON WHITE, a citizen of the United States of America, residing at Warsaw, in the county of Benton and State of Missouri, have invented a certain new and useful Muzzle, of which the following is a specification, reference being had therein to the accompanying drawings.

This invention relates to muzzles; and the object in view is to provide a muzzle capable of being fitted to cows, horses, and other animals, with a view to preventing such animals while grazing from cropping or nibbling the grass too close to the ground. As is well known, when animals eat off the grass too close to the ground the roots of the grass are disturbed and loosened, and thereby injured, greatly enfeebling the roots and rendering the grass very sensitive to the rays of the sun. The muzzle herein illustrated and described is designed to prevent the animal from eating the grass within several inches of the ground, and, while capable of being adjusted to different animals, the muzzle is also capable of being adjusted upon any one animal so as to diminish or increase the lengths of the parts which prevent the animal from grazing too closely.

The detailed objects and advantages of the invention will appear in the course of the ensuing description.

The invention consists in a muzzle embodying certain novel features and details of construction and arrangement of parts, as hereinafter fully described, illustrated in the drawings, and incorporated in the claim.

Figure 2:
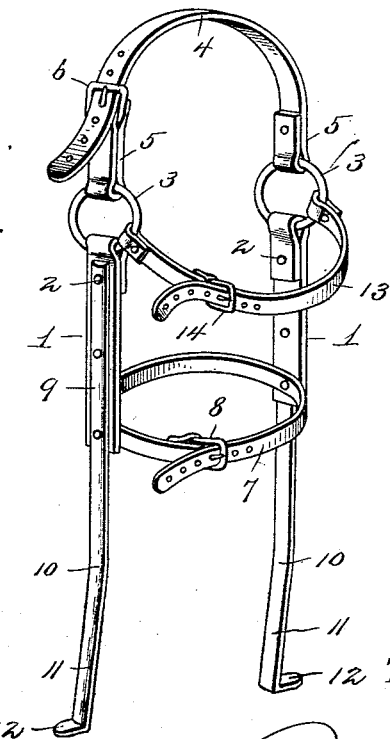

In the accompanying drawings, Figure 1 is a perspective view of the muzzle, showing the same applied to an animal. Fig. 2 is an enlarged view of the muzzle, showing its construction and showing an auxiliary throat-strap for adapting the device to be used upon a horse.

Similar numerals of reference designate corresponding parts in both figures of the drawings.

The muzzle contemplated in this invention comprises a pair of side or cheek straps 1, adapted to lie on opposite sides of the animal's head and extend lengthwise thereof. These straps have their upper ends looped and riveted, as shown at 2, to receive metal rings 3, and these rings are connected by means of a head-strap 4, having its ends looped, as at 5, to receive the rings 3, and provided at a point intermediate its length with an adjusting-buckle 6, by means of which the head-strap may be lengthened and shortened.

Connected to the lower ends of the side or cheek straps 1 is a nose-strap 7, provided at a suitable point with an adjusting-buckle 8, permitting the muzzle to be fitted closely about the head of the animal and preventing the muzzle from slipping upward on the animal's head.

Riveted or otherwise permanently secured to the upper sides of the side or cheek straps 1 are extension bars or guards 9, preferably formed of half-round metal. These bars extend, by preference, the entire length of the cheek-straps 1 and a sufficient distance beyond or below the cheek-straps to strike against the ground and prevent the animal from getting its teeth within several inches of the ground, said bars being bent at the points 10 to extend slightly at an angle to the upper portions thereof, thus forming inclined leg portions 11, which are deflected outwardly in opposite directions at their lower extremities to form feet 12, which will ride or trail upon the ground without penetrating or digging into the same, thereby injuring the grass. Where the muzzle is to be applied to a horse or mule, an additional or auxiliary throat-strap 13 is employed, having an adjusting-buckle 14.

In use the muzzle is placed upon the animal's head, and the head and nose straps are adjusted to secure a good fit, leaving the feet 12 projecting several inches below the animal's mouth, so as to prevent the animal from eating the grass too close to the ground. To adjust the muzzle upward on the head of the animal and allow him to eat closer to the ground, the nose-strap is loosened and the head-strap tightened. To set the muzzle lower on the animal's head, the operation just described is reversed. The muzzle is likewise capable of being fitted upon animals with heads of different sizes and shapes.

The article is very simple in construction and involves no parts which are liable to get out of order or become broken. When applied to an animal's head, it forms an effectual guard, and while it protects the pasture and permits a more vigorous growth of the grass it at the same time prevents the animal from eating the new growth, which is detrimental to the animal's health. By preventing cows from eating too closely to the ground the disagreeable flavor in milk and butter is to a considerable extent avoided and firmer butter is obtained. The muzzle allows the animal to drink, except in very shallow water.

Having thus described the invention, what I claim as new, and desire to secure by Letters Patent, is—

An adjustable muzzle comprising side or cheek straps, extension bars or guards secured to and extending longitudinally of the cheek-straps and projecting beyond the lower ends thereof and having their extremities deflected to form laterally and outwardly projecting feet, and adjusting and holding means comprising a head-strap provided with an adjusting-buckle, and a nose-strap connecting the lower ends of the cheek-straps and provided with an adjusting-buckle, substantially as described.

In testimony whereof I affix my signature in presence of two witnesses.

THOMAS BENTON WHITE.

Witnesses:
ROSA MAHANEY,
CHAS. R. FRANCIS.